Patented Feb. 8, 1944

2,341,134

UNITED STATES PATENT OFFICE 2,341,134

GREASE

Elmer Wade Adams, Hammond, Ind., and Lawrence C. Brunstrum and George W. Flint, Chicago, Ill., assignors to Standard Oil Company, Chicago, Ill., a corporation of Indiana No Drawing. Application May 29, 1941,
Serial No. 395,824

11 Claims. (Cl. 252—39)

The present invention relates to improvements in greases, and more particularly to the use of calcium soaps of hydrogenated fish oil fatty acid pitch in greases to impart improved properties thereto. The invention is particularly adapted to calcium soap greases such as, for example, cup greases, gear greases, chassis lubricants, bearing greases, water-proof greases, neck greases, slushing greases, etc. The invention is also adapted to the use of these calcium soaps in conjunction with soda soaps in greases such as driving journal greases, and the like.

We have discovered that calcium soap greases having improved stability, texture and other desirable properties can be obtained by employing calcium soaps of hydrogenated fish oil fatty acid pitch. The soap constituent of such greases may consist entirely of the calcium soap of hydrogenated fish oil fatty acid pitch or the soap content of such greases may comprise these soaps in conjunction with the calcium soaps of lower molecular weight fatty acids of eighteen carbon atoms or less, such as palmitic acid and stearic acid and other fatty acids.

Hydrogenated fish oil fatty acid pitch is obtained by the distillation of hydrogenated fish oils. The fish oil which may be used for example, sardine oil, herring oil, codfish oil, menhaden oil and the like, is first split by any of the well-known means to produce glycerine and fatty acids. After separation of the glycerine the fatty acids are hydrogenated. If desired, the fish oil may be hydrogenated first and then split to produce glycerine and hydrogenated fatty acids. The hydrogenated fatty acids are substantially distilled to produce an overhead distillate of hydrogenated fish oil fatty acids and a residue referred to herein as No. 1 pitch. The No. 1 pitch in which are concentrated residual fats and a high percentage of high molecular weight fatty acids, may be used as such. However, it is preferred to submit No. 1 pitch to a further splitting operation to produce more glycerine and hydrogenated fatty acids. After separation of the glycerine the hydrogenated fatty acids are distilled to produce an overhead of hydrogenated fish oil fatty acids which may be combined with a distillate from the first distillation. The residue resulting from the second distillation is the material we prefer to use and is referred to herein as No. 2 pitch.

These pitches, although commonly referred to as stearine pitches, are not to be confused with the tarry fatty acid pitches obtained by the distillation of animal and vegetable fatty materials. The pitch obtained as a residue in the distillation of hydrogenated fish oils is distinguished from the so-called stearine pitches and from animal and vegetable fatty materials in that the latter are unsaturated, relatively high in unsaponifiable matter and deficient in fatty acids above $C_{18}$. In contrast to these pitches, the pitches obtained from the distillation of hydrogenated fish oils are saturated, rich in $C_{20}$ to $C_{24}$ and higher molecular weight fatty acids and are relatively poor in unsaponifiable matter. These pitches contain at least 50% of high molecular weight fatty acids having from 20 to 24 or more carbon atoms per molecule, counting, in addition to the free fatty acids, the fatty acids obtainable by hydrolyzing the fats present in the pitches. Stearine pitches obtained from vegetable and animal fats are dark tarry materials, whereas the pitches obtained from the distillation of hydrogenated fish oils are crystalline in structure and are of relatively light color. These latter pitches have a low iodine value of approximately 4 to 5 as determined by the Hanus method, which indicates that they are as saturated as double pressed stearic acid.

In Table I are inspection data on representative samples of No. 1 pitch and No. 2 pitch from hydrogenated fish oil fatty acids.

TABLE I

| | No. 1 pitch | | No. 2 pitch | |
|---|---|---|---|---|
| Free fatty acid (as oleic)......per cent.. | 16.6 | 18.4 | 10.5 | 15.3 |
| Fat.........................................do.... | 79.7 | 79.7 | 79.3 | 74.2 |
| Total fatty acid.........................do.... | 93.0 | 94.8 | 86.5 | 86.3 |
| Moisture-insoluble-unsaponifiable....do.... | 4.3 | 3.9 | 10.4 | 11.8 |

As indicated in the above table the pitches have a relatively low moisture-insoluble-unsaponifiable content. The high total fatty acid content of these pitches as compared to the fatty acid content of substantially not more than 10% for the so-called stearine pitches from animal and vegetable fats makes the former valuable as soap stock in grease making.

The composition of No. 1 and No. 2 pitches from hydrogenated fish oil fatty acids and the composition of the distilled hydrogenated fish oil fatty acids is given in Table II.

TABLE II

Composition of fatty acids

| | No. 1 pitch | No. 2 pitch | Distilled hydrogenated fish oil fatty acids |
|---|---|---|---|
| $C_{10}$ | 3.5 | 2.5 | 6.7 |
| $C_{16}$ | 20.0 | 9.2 | 28.8 |
| $C_{18}$ | 20.8 | 14.2 | 25.1 |
| $C_{20}$ | 21.1 | 17.6 | 21.1 |
| $C_{22}$ | 27.1 | 37.7 | 15.4 |
| $C_{24}$ and unidentified | 7.5 | 18.8 | 2.9 |

As noted from the above data these pitches, particularly the No. 2 pitch, are rich in fatty acids having 20 and higher carbon atoms per molecule.

Heretofore in the preparation of cup grease it has been necessary to incorporate some water or other stabilizing agent in the grease in order to obtain a product which will not separate or break down. We have discovered that extremely stable cup greases can be prepared without the necessity of employing water or any other stabilizing agent, by using the calcium soap of hydrogenated fish oil fatty acid pitch, either as the sole soap constituent of the grease or as a partial soap constituent replacing a portion of the calcium soap of conventional fatty acids of 16 to 18 carbon atoms. In accordance with the present invention cup greases of any desired soap content, generally from about 1% to about 35%, may be used, depending upon the consistency desired. However, at least about 35% of the total soap should be calcium soap of hydrogenated fish oil fatty acid pitch. Thus, for example, in the preparation of various grades of cup grease from about 3% to about 25% calcium soap is employed, the heavier greases containing the higher percentages of soap. Since at least 35% of the total soap used in these greases should be a calcium soap of hydrogenated fish oil fatty acid pitch, the minimum amounts of this soap which should be employed in making cup greases in the above soap range is from about 1.0% for the softest grease to about 8.75% for the hardest grease.

Typical formulae for the preparation of a cup grease, for example a No. 3 cup grease, in accordance with our invention are illustrated by the following examples:

| | Percent |
|---|---|
| I. Calcium soap of hydrogenated fish oil fatty acid pitch No. 2 | 17 |
| Petroleum oil | 83 |
| II. Calcium soap of hydrogenated fish oil fatty acid pitch No. 1 | 15 |
| Petroleum oil | 85 |
| III. Calcium soap of conventional fatty acids of not more than 18 carbon atoms | 9 |
| Calcium soap of hydrogenated fish oil fatty acid pitch | 6 |
| Petroleum oil | 85 |
| IV. Calcium soap of tallow | 3 |
| Calcium soap of hydrogenated fish oil fatty acid pitch | 12 |
| Petroleum oil | 85 |

The foregoing examples are given by way of illustration only, and are not our intention to limit the scope of the invention thereto. Obviously, the soap contents specified above can be varied to obtain products of different consistencies.

The method of preparing calcium soap grease of the present invention is materially simplified since the calcium soap of hydrogenated fish oil fatty acid pitch is soluble in hot petroleum oil and forms a stable gel upon cooling. The preparation of greases of the type hereindescribed requires only that the soap be made and dried in an equal volume of oil, followed by grading in the required amount of oil to obtain the desired consistency. The saponification can be carried out by melting and heating the predetermined quantity of hydrogenated fish oil fatty acid pitch to a temperature of about 200° F. to 210° F., adding the calculated amount of lime, and then increasing the temperature to about 220° F. to about 240° F. After the saponification has been completed an equal volume of petroleum oil of the desired viscosity is added to the mixture, the temperature increased to about 300° F. to 320° F., and maintained at that temperature until substantially all of the water has been eliminated. After the mixture has been dried the batch is cooled and graded to the desired consistency by the addition of oil.

The petroleum oil employed may vary over a wide range, the type of oil used being largely dependent upon the type of service for which the grease is to be employed. Petroleum oils having viscosities ranging from about 80 seconds to about 500 seconds or higher at 100° F. Saybolt Universal may be used, and preferably from about 100 seconds to about 300 seconds at 100° F. Saybolt Universal.

Another application of the use of calcium soaps of hydrogenated fish oil fatty acid pitch is in the preparation of improved greases of the soda soap type. One of the important problems of grease development in recent years has been the modification of the tough, gutty nature of the soda soap greases to make them better suited to numerous modern grease-lubricated installations. Among the methods heretofore used to modify these soda soap greases are (1) the use of rosin soap, (2) the use of excess alkali, (3) high temperature manufacturing, and (4) the milling of the grease. However, each of these means has certain disadvantages. We have discovered that the calcium soap of hydrogenated fish oil fatty acid pitch when added to soda soap greases effectively produces a smoother grease without impairing the other desirable properties thereof. For example, we have found it advantageous to prepare driving journal greases having a total soap content of from about 30% to about 75%, with from about 10% to about 30% of the total soap content being the calcium soap of hydrogenated fish oil fatty acid pitch.

Our invention also contemplates the use of calcium soap of hydrogenated fish oil fatty acid pitch as an adjunct in other soda soap greases such as wheel bearing greases, ball bearing greases and the like. In wheel bearing greases containing from about 15% to about 35% soda soap, and in ball bearing greases containing from about 5% to about 25% soda soap, we have found it advantageous to incorporate therein the calcium soap of hydrogenated fish oil fatty acid pitch in amounts of from about 5% to about 25% of the total soap content. The soda soap constituent in these greases may be the soda soap of various fats or fatty acids such as tallow, fish oil, vegetable oil, or the soda soap of hydrogenated fish oil fatty acid pitch.

Another type of grease in which the calcium soap of hydrogenated fish oil fatty acid pitch can be effectively employed is in the so-called slushing greases which are primarily used as rust preventatives. One of the most serious problems associated with these slushing greases, particularly those containing petrolatum, is their tendency to slip, thereby exposing a metal surface to be protected and subjecting the same to the elements. As a result of this, the desired protection is not obtained and serious corrosion and rusting is encountered. We have discovered that by incorporating the calcium soap of hydrogenated fish oil fatty acid pitch with slushing greases the tendency of such grease to slip is substantially eliminated. We have found that from about 5% to about 30% of calcium soap of hydrogenated fish oil fatty acid pitch can be used in slushing greases. The other constituents of the slushing grease may comprise oil-soluble petroleum sulfonic soaps, otherwise known as mahogany soaps, oil, wax, and/or petrolatum, such as described in United States Patents 1,630,101, 1,795,993, 2,119,522 and 2,186,018.

Although we have described our invention by referring to specific types of greases, our invention is not to be limited to such greases or to the formulae disclosed herein. It is to be understood, of course, that relatively inert materials such as graphite, mica, carbon black, vermiculite, asbestos fibres, and the like, may be included in the formulae of these greases without departing from the spirit of the invention.

The percentages expressed herein and in the appended claims are given as weight percentages.

The present invention is not to be limited by any specific examples which have been presented herein solely for the purposes of illustration, but only by the following claims.

We claim:

1. A stable, substantially anhydrous, stabilizer-free calcium soap grease characterized by its resistance to separation and breakdown containing petroleum oil and a calcium soap of hydrogenated fish oil fatty acid pitch.

2. A stable, substantially anhydrous, stabilizer-free calcium soap grease characterized by its resistance to separation and breakdown containing petroleum oil and from about 1% to about 35% calcium soap of hydrogenated fish oil fatty acid pitch.

3. A stable, substantially anhydrous, stabilizer-free calcium soap cup grease characterized by its resistance to separation and breakdown containing petroleum oil and calcium soaps at least 35% of which is a calcium soap of hydrogenated fish oil fatty acid pitch.

4. A stable, substantially anhydrous, stabilizer-free calcium soap cup grease characterized by its resistance to separation and breakdown containing petroleum oil, calcium soap of conventional fatty acids having from about 16 to about 18 carbon atoms in the molecule, and a calcium soap of hydrogenated fish oil fatty acid pitch, said calcium soap of hydrogenated fish oil fatty acid pitch being present in an amount of at least 35% of the total soap content of said cup grease.

5. A stable, substantially anhydrous, stabilizer-free calcium soap cup grease characterized by its resistance to separation and breakdown containing petroleum oil, calcium soap of conventional fatty acids having from about 16 to 18 carbon atoms in the molecule, and a calcium soap of hydrogenated fish oil fatty acid pitch, said cup grease having a total soap content of from about 1% to about 35% of which at least about 35% is a calcium soap of hydrogenated fish oil fatty acid pitch.

6. A stable, substantially anhydrous, stabilizer-free calcium soap grease characterized by its resistance to separation and breakdown containing petroleum oil, soda soap and a calcium soap of hydrogenated fish oil fatty acid pitch.

7. A stable, substantially anhydrous, stabilizer-free calcium soap grease characterized by its resistance to separation and breakdown containing petroleum oil, a soda soap, and a calcium soap of hydrogenated fish oil fatty acid pitch, said grease having a total soap content of from about 30% to about 75%, of which from about 10% to about 30% is a calcium soap of hydrogenated fish oil fatty acid pitch.

8. A stable, substantially anhydrous, stabilizer-free calcium soap grease characterized by its resistance to separation and breakdown containing petroleum oil, a sodium soap and a calcium soap of hydrogenated fish oil fatty acid pitch, said grease having a total soap content of from about 5% to about 25% of which from about 5% to about 25% is a calcium soap of hydrogenated fish oil fatty acid pitch.

9. A stable, substantially anhydrous, stabilizer-free calcium soap grease characterized by its resistance to separation and breakdown as described in claim 8 in which the soda soap is a soda soap of fatty acids having not more than about 18 carbon atoms in the molecule.

10. A grease as described in claim 8 in which the soda soap is a soda soap of hydrogenated fish oil fatty acid pitch.

11. A stable, substantially anhydrous, stabilizer-free calcium soap grease characterized by its resistance to separation and breakdown containing a petroleum oil, a calcium soap of hydrogenated fish oil fatty acid pitch and an inert material of the class of graphite, mica, vermiculite and asbestos.

ELMER WADE ADAMS.
LAWRENCE C. BRUNSTRUM.
GEORGE W. FLINT.

CERTIFICATE OF CORRECTION.

Patent No. 2,341,134. February 8, 1944.

ELMER WADE ADAMS, ET AL.

It is hereby certified that error appears in the printed specification of the above numbered patent requiring correction as follows: Page 1, second column, line 52, Table II, for "$C_{10}$" read --$C_{14}$--; page 3, second column, line 32, beginning with "A stable, substantially" strike out all to and including the word and period "molecule." in line 37, comprising claim 9, and insert instead the following -

--A grease as described in claim 8 in which the soda soap is a soda soap of conventional fatty acids having from about 16 to 18 carbon atoms in the molecule.--;

and that the said Letters Patent should be read with this correction therein that the same may conform to the record of the case in the Patent Office.

Signed and sealed this 18th day of April, A. D. 1944.

Leslie Frazer (Seal) Acting Commissioner of Patents.